Jan. 2, 1968 R. E. JOHNSON ET AL 3,361,530
PROCESS FOR PURIFYING GALLIUM ARSENIDE
Original Filed Dec. 11, 1959
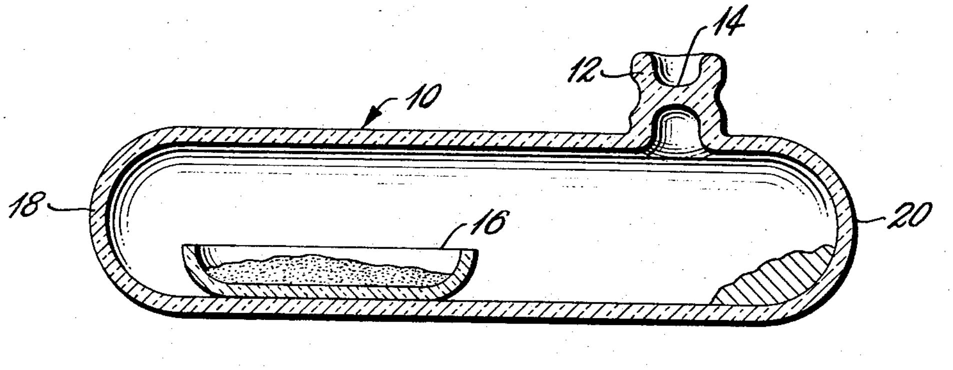
INVENTORS
Rowland E. Johnson &
Edward W. Mehal
BY Stevens, Davis, Miller & Mosher
ATTORNEYS United States Patent Office 3,361,530
Patented Jan. 2, 1968

3,361,530
PROCESS FOR PURIFYING GALLIUM ARSENIDE

Rowland E. Johnson and Edward W. Mehal, Dallas, Tex., assignors to Texas Instruments Incorporated, Dallas, Tex., a corporation of Delaware Continuation of application Ser. No. 859,059, Dec. 11, 1959. This application Dec. 9, 1966, Ser. No. 600,653
11 Claims. (Cl. 23—204)

ABSTRACT OF THE DISCLOSURE

The process for producing substantially pure gallium arsenide which comprises heating within a reaction chamber appropriate quantities of elemental gallium and arsenic, or relatively impure gallium arsenide, to elevated temperatures under evacuated conditions in the presence of a vapor-phase halide, thereby to transform either the constituent elements or the solid compound gallium arsenide to a vapor phase, the vapor phase halide further acting as a carrier to relocate the constituent elements or the compound in purified form on a relatively cool surface within the reaction chamber.

This application is a continuing of patent application Ser. No. 859,059, filed Dec. 11, 1959.

This invention relates to a method of producing and purifying compound semiconductors. More particularly, the invention relates to the production and purification of gallium arsenide by relocation techniques.

Compound semiconductors are customarily produced by a variety of methods. For instance, gallium arsenide is customarily produced by reacting liquid gallium with arsenic in the vapor stage at a temperature at least as high as the melting point of gallium arsenide. However, this method has a disadvantage in requiring a relatively high temperature which increases the susceptibility toward contamination.

It has also been suggested that gallium arsenide be prepared by reducing gallium oxide with a gaseous stream of heated hydrogen and arsenic vapors. However, the hydrogen reduction of gallium oxide is difficult to complete, and the resulting compound semiconductor is heavily contaminated with oxygen.

The compound semiconductor, such as gallium arsenide, can also be formed by sublimation techniques. Using the sublimation techniques, proper quantities of the required elements will be vaporized and then condensed to the solid state on a relatively cool surface. Using sublimation techniques, the less volatile impurities are left behind, but the more volatile impurities are carried over to the deposit. Also, the compound semiconductors ordinarily undergo sufficient decomposition in vapor phase for the volatility characteristics of the component elements to become of major significance. Thus, gallium with its boiling point of almost 2,000° C. and arsenic with its sublimation point of about 640° C. at one atmosphere pressure, differ sharply in their relative volatility. Vaporization of gallium arsenide and subsequent deposition results in a disproportionately lesser quantity of gallium being deposited on the condensing surface, thereby upsetting the stoichiometric relationship of gallium arsenide. As a result, the purification incident to the conventional sublimation procedure is of little or no value because of the simultaneous separation of the two ingredient elements.

From the above, it is evident that the known methods for producing compound semiconductors, such as gallium arsenide, will normally introduce contamination into the completed product. Because of the high purity required of semiconductor materials for electronic use, it is desirable to produce compound semiconductors by methods which introduce a minimal amount of impurities into the completed product.

It is therefore one object of the present invention to provide a novel relocation process for the production of compound semiconductors.

Another object of the instant invention is to provide a closed system process for forming gallium arsenide at temperatures below the melting point of gallium arsenide.

A further object of the invention is to provide a novel relocation process for purifying compound semiconductors, such as gallium arsenide.

Further objects and advantages of the instant invention will be apparent from the following description taken in conjunction with the appended drawing, which shows a bomb tube used in the practice of this invention.

Briefly stated, one embodiment of the present invention comprises heating appropriate quantities of elemental gallium and arsenic to elevated temperatures under evacuated conditions in the presence of catalytic amounts of a relatively volatile halide (which may be an elemental halogen, such as $Br_2$, $Cl_2$, etc., but preferably, is arsenic trichloride), and thereafter depositing the entrained material on a relatively cool surface. The relocated material comprises the compound semiconductor product of a relatively high degree of purity.

In a second embodiment of the invention, relatively impure compound semiconductor material is heated at elevated temperatures under evacuated conditions in the presence of a halide and deposited on a cool surface, as described above. The relocated material will comprise the compound semiconductor largely purified of such impurities as, for example, magnesium, manganese, iron, silicon, copper, boron, aluminum, and titanium.

It is to be noted that this invention is not in any sense a sublimation process. Sublimation is generally considered as a direct transition from solid phase to gas phase, and vice versa. In the present process, a catalytic vapor is necessarily used to transform either the solid compound semiconductor or its constituent elements to a vapor stage and to serve as a carrier which will allow the compound semiconductor or its constituent elements to be relocated as a compound semiconductor possessing the correct stoichiometric relationship, but in a more purified form. It is to be appreciated that this process occurs at temperatures substantially below the boiling or melting point of the compound semiconductor being formed, thus reducing the tendency toward contamination. The halides, which are generally contemplated for use, must be more volatile than the compound semiconductor treated. Thus, the instant invention contemplates use of the free halogens, the hydrohalide, for example HCl, and the halide of any constituent element in the semiconductor, such as the chlorides of gallium or arsenic. A particularly preferred embodiment of the present invention provides for the production and/or purification of gallium arsenide by relocation in the presence of arsenic trichloride. Other reactive elements, such as sulphur, have been found to accomplish the relocation, but often these elements will be found in the deposited material as an impurity element.

The amount of halide employed is usually measured in terms of the partial pressure of the halide at room temperature, not in terms of weight of material being relocated. A reasonable amount would be that amount producing approximately 10 millimeters mercury pressure of the halide in the bomb tube at room temperature. The maximum partial pressure of the halide used will be dependent upon the pressure which the bomb tube may safely withstand; the lower limit will be less than 1 millimeter mercury pressure at operating temperature. The pressure of extraneous gases should be as low as possible, but certainly below 0.1 millimeter of mercury pressure. The halide, if appreciably volatile, may be cooled during the evacuation and sealing off of the tube.

The vapor phase halide appears largely to act as a carrier. In the production of gallium arsenide, it is theorized that the halide reacts with the gallium under heat, transforming it into vapors of a more volatile gallium halide. This reaction will occur whether the gallium is present in the elemental state or in the compound, gallium arsenide. The arsenic, being volatile at sublimation temperatures, vaporizes. At a relatively cooler region of the bomb tube, an excess of arsenic will be present, causing the reaction to reverse, producing gallium arsenide and more stable halides. The gallium arsenide is stable and non-volatile, while the halides are sufficiently volatile to remain in the vapor phase for diffusion back to the high temperature zone containing the materials being relocated.

Aside from their effect on transfer time, the temperatures at both hot and cold ends also affect the nature of the product. It is believed that the higher relocation temperatures result in deposition of small crystals, while lower relocation temperatures result in deposition in the form of large needle-like crystals.

For further understanding of the invention, reference is made to the attached drawing which diagrammatically illustrates an apparatus suitable for practice of the present invention.

As shown in the single figure of the drawing, an elongated reactor vessel 10 (bomb tube) is used. The vessel or tube 10 is charged with a boat 16 containing the material to be relocated. The tube is evacuated through opening 12, and sufficient quantity of the halide is added to effect a pressure of 10 millimeters of mercury. The opening 12 is closed by a seal 14. Boat 16 is not necessary, as the materials may be charged directly into the bomb tube. Evacuated bomb tube 10 is placed into a suitable furnace (not shown) where the end 18 is heated to the proper reaction temperature, while the opposite end 20 is heated only to a suitable temperature for the condensation of the compound semiconductor. The material is relocated from end 18, and is condensed at some point intermediate the ends 18 and 20.

According to a specific example of the first embodiment of this invention, appropriate quantities of gallium and arsenic are placed in the end 18 of the bomb tube, such as is described above. The quantity of a halide, preferably arsenic trichloride, which will give a pressure in the bomb tube of approximately 10 millimeters of mercury at room temperature is introduced into the bomb tube, and the system is sealed. As mentioned before, the maximum pressure used will be dependent upon the pressure which the tube may safely withstand, and the lower limit can be less than one millimeter mercury pressure at operating temperature.

The end of the tube containing the gallium is raised to a temperature in the range of 850° C. to 1300° C., but preferably 1000° C. to 1100° C. At this temperature, the arsenic sublimes and becomes a vapor. It is thought the catalyst, arsenic trichloride, reacts with the gallium to form gallium dichloride and arsenic. The gallium dichloride then begins to diffuse down the length of the bomb tube. The concentration of the gallium dichloride will be highest at the high temperature end of the tube.

The cooler end of the bomb tube is maintained at a temperature of from 500–900° C., but preferably 550–650° C. The concentration of the arsenic will be highest at the cooler end of the tube, as this is the location at which the arsenic will tend to sublime into the solid state. At some point in the tube intermediate the ends 18 and 20, appropriate temperature and relative concentrations will be reached such that the gallium dichloride will disproportionate and the gallium will combine with the vaporized arsenic to form gallium arsenide, the gallium arsenide precipitating out into the solid state. The gallium trichloride formed will then diffuse back down the bomb tube and react with the elemental gallium in the hotter part of the bomb tube to again form gallium dichloride, and the process is repeated. In this manner, the chloride is used as a carrier for vaporizing the gallium at lower than normal temperature, and moving the gallium to a region of the bomb tube where conditions are proper for the formation of gallium arsenide. It is to be appreciated that when this process is carried out with the coolest point in the bomb tube maintained at a temperature much above the sublimation temperature of arsenic, it is necessary to have a tube which can withstand several atmospheres of pressure, as the vapor pressure of arsenic is very high at temperatures above its sublimitation point.

There are several advantages in this process over those of the prior art. However, the primary advantage is that the gallium arsenide is prepared at a temperature lower than the melting point of the compound, thereby reducing the possibility of contamination due to contact of the molten compound with the bomb tube and apparatus.

The following are specific examples illustrating the practice of this first embodiment of the present invention.

*Example I*

A quartz boat containing 56.7 grams of gallium was placed in a bomb tube and heat treated at 800° C. in a helium stream to clean the surface of the gallium. The bomb tube was then cooled, and 61.9 grams of arsenic was placed inside the tube. The bomb tube was heated to a temperature at which the oxide film on the arsenic was removed by sublimation. The bomb tube was evacuated to a high vacuum. Sufficient arsenic trichloride was added to the bomb tube to effect a pressure of 10 millimeters of mercury, and the bomb tube was sealed. The bomb tube was placed in a two-zone furnace, and the end of the bomb tube containing the quartz boat was raised to a temperature of 1000° C. The opposite end of the bomb tube was raised to a temperature of 620° C. These temperatures were maintained for thirteen hours, at which time it was determined that the relocation was complete. The weight of gallium arsenide produced was 116.5 grams. The following table shows the relative impurity concentrations in the original arsenic and gallium as compared to the impurity concentration in the gallium arsenide.

TABLE 1

| Impurity Material | Arsenic | Gallium | Gallium Arsenide |
|---|---|---|---|
| Cu | 1–10 | 1–10 | 0.5–1 |
| Fe | 0.5–1 | 0.5–1 | 0.5–1 |
| Mg | 0.1–0.5 | 0.1–0.5 | 0.05–0.1 |
| Mn | ---------- | ---------- | 0.05–0.1 |
| Si | 0.1–0.5 | ---------- | 0.05–0.1 |
| Ag | ---------- | 0.5–1 | ---------- |

In the above table, all data is given in parts per million obtained by spectrographic analysis. Diodes made from the material thus produced had a breakdown voltage of approximately 140 volts.

*Example II*

The procedure outlined in Example I was followed with the exception that the low temperature end was maintained at 620° C., and the high temperature end was maintained at a temperature of 800° C. for 12.5 hours and then raised to a temperature of 900° C. for 24.5 hours. Only 52.0 grams of gallium and 57.0 grams of arsenic were used. The yield from this run was 105 grams of gallium arsenide. The relative impurity concentration data of this example are given below in Table 2. The figures are again given in parts per million, and were obtained by spectrographic analysis.

TABLE 2

| Impurity Material | Arsenic | Gallium | Gallium Arsenide |
|---|---|---|---|
| Cu | 1–10 | 0.5–1 | 1–10 |
| Fe | 0.5–1 | 1–10 | 0.5–1 |
| Mg | 0.1–0.5 | 0.5–1 | 0.5–1 |
| Mn | ---------- | 0.1–0.5 | 0.05–0.1 |
| Si | 0.1–0.5 | ---------- | 0.1–0.5 |
| Ag | ---------- | ---------- | 0.05–0.1 |

In a second embodiment of the invention, commercially available gallium arsenide was purified using the methods of this invention. The process is identical to the one described above for the production of gallium arsenide except that gallium arsenide is used in place of elemental gallium and arsenic in the bomb tube.

The following specific examples illustrate the practice of this second embodiment to the instant invention.

*Example III*

Approximately one pound of GaAs produced in Bridgeman apparatus (following the Bridgeman process for making GaAs) was placed in one end of the bomb tube, and the tube was evacuated to $10^{-5}$ cm. of Hg. $AsCl_3$ was added to the tube to effect a pressure of 10 mm. $AsCl_3$ at room temperature.

The tube was then sealed and placed in a furnace and heated at said one end to 1100° C. and at the other end to a temperature of about 600° C. These temperatures were maintained until over 80% of the GaAs relocated, and then the tube was gradually cooled. The following table sets forth the results of the above.

TABLE 3

| Impurity Material | Bridgeman Ingot | Relocated GaAs | Sample Crystal | | |
|---|---|---|---|---|---|
| | | | #1 | #1 | #3 |
| Fe | .5–.05 | .5–.05 | .1–1 | .1–1 | .05–.5 |
| Cu | 1–10 | .05 | .5–1 | .1–10 | .5–1 |
| Ag | 0–.5 | ---------- | ---------- | .1–.5 | ---------- |
| Ti | 0–.1 | ---------- | .5–1 | .1–.5 | .05–.1 |
| Si | .05–.5 | .05–.5 | .5–1 | .1–1 | .1–.5 |
| Mg | .1–1 | .05–.5 | .5–1 | .1–1 | .1–1 |
| Al | ---------- | .05–.5 | ---------- | ---------- | .1–.5 |

In the above table, all data given is by parts per million obtained by spectrographic analysis. Diodes were made from the Bridgeman ingot and from the relocated material using single crystals cut out of the material. The peak inverse voltage for the Bridgeman ingot diode was 2 to 9 volts, whereas for the relocated material diode it was 100 volts average. The crystal from the relocated material was N-type.

The three sample crystals were grown by conventional techniques, and #1 was P-type having a resistivity of 0.58 ohm-cm. #2 was N-type having a resistivity of 7500–2 ohm-cm. #3 was P-type having a resistivity of 5–2 ohm-cm.

*Example IV*

The procedure outlined in Example III was followed, but in this case using a temperature of 1050° C. for the hot end, and a temperature of 700° C. for the cool end.

The results are contained in the following Table 4, all figures being in parts per million.

TABLE 4

| Impurity Material | Original Material | Relocated Material | Residue |
|---|---|---|---|
| Al | 10–100 | ---------- | 1–10 |
| Ag | 0.1–1 | 0.1 | 1–10 |
| Sb | 1–10 | 1–10 | 1–10 |
| Bi | ---------- | 0.1–1 | 1–10 |
| Cu | 1–10 | 1–10 | $100–10^3$ |
| Cr | ---------- | ---------- | 0.1–1 |
| Fe | 1–10 | 1–10 | 10–100 |
| Ge | ---------- | ---------- | 0.1–1 |
| Mg | 10–100 | 1–10 | 1–10 |
| Mn | 1–10 | 0.1–1 | 1–10 |
| Ni | ---------- | 1–10 | 1–10 |
| Pb | 1–10 | 0.1–1 | 10–100 |
| Si | $100–10^3$ | 1–10 | $10^3–10^4$ |
| Sn | 1–10 | 1–10 | 10–100 |
| Ti | ---------- | ---------- | 1–10 |
| V | ---------- | ---------- | 1–10 |

The above was obtained by spectrographic analysis. A diode made from the original material had a peak inverse voltage of 0.6 volt, whereas one made from the relocated material had a breakdown of 6 volts.

*Example V*

The same procedure as set forth in Example III was used except for a hot end temperature of 1100° C. and a cool end temperature of 600° C. The results are set forth in Table 5, all figures given in parts per million.

TABLE 5

| Impurity Material | Original Material | Relocated Material |
|---|---|---|
| Al | .1 | ---------- |
| Ag | .1 | ---------- |
| Cu | .1–1 | ---------- |
| Fe | .1–1 | ---------- |
| Mg | .1–1 | .1–1 |
| Mn | .1 | ---------- |
| Pb | .1 | ---------- |
| Si | 1–10 | .1 |

A crystal grown from the relocated material was of N-type having a resistivity of 0.58 ohm-cm. A series of diodes made from the relocated material had peak inverse voltages of from 60 to 20 volts.

*Example VI*

The procedure of Example III was used. The results are contained in Table 6 (figures given in parts per million) as obtained by spectrographic analysis.

TABLE 6

| Impurity Material | Original Material | Relocated Material | Sample Crystal Grown From Relocated Material |
|---|---|---|---|
| Mg | .1–1 | .1–1 | .1–1 |
| Si | .1 | .1 | .1 |
| Fe | .1–1 | ---------- | ---------- |
| Cu | .1–1 | ---------- | .1 |

The sample crystal grown was P-type having a resistivity of about 6000 ohm-cm.

Vapors other than halides, such as sulphur, may be used in the relocation process. However, care must be exercised in that the vapor chosen, whether a halide or elemental vapor, must not contaminate the relocated material with undesirable impurities which will be difficult to remove.

Although the invention has been shown and described with reference to the best modes for carrying it out and with reference to specific examples, it will be appreciated that changes and modifications can be made which do not depart from the inventive concepts. Such are within the purview of the invention.

What is claimed is:

1. A process for producing the compound gallium arsenide in crystalline form which comprises heating in a chamber gallium arsenide to a temperature sufficiently elevated to effect volatilization thereof in the presence of a vapor member selected from the group consisting of free halogens and halides of gallium, and maintaining a surface within said chamber at a temperature below the melting point of gallium arsenide and sufficiently below the first recited temperature to permit the deposition of crystals of gallium arsenide thereon.

2. A process for producing the compound gallium arsenide in crystalline form which comprises heating in a chamber gallium arsenide to a temperature sufficiently elevated to effect volatilization thereof in the presence of free halogens and maintaining a surface within said chamber at a temperature below the melting point of gallium arsenide and sufficiently below the first recited temperature to permit the deposition of crystals of gallium arsenide thereon.

3. A process for producing the compound gallium arsenide in crystalline form which comprises heating in a chamber gallium arsenide to a temperature sufficiently elevated to effect volatilization thereof in the presence of halides of gallium and maintaining a surface within said chamber at a temperature below the melting point of gallium arsenide and sufficiently below the first recited temperature to permit the deposition of gallium arsenide in crystalline form thereon.

4. A process for purifying the compound semiconductor gallium arsenide which comprises heating in a chamber relatively impure gallium arsenide to a temperature of from about 850° C. to about 1300° C. in the presence of the vapor of a member selected from the group consisting of free halogens, hydrogen halides, halides of gallium and halides of arsenic, and maintaining a surface within said chamber at a temperature of from about 500° C. to about 900° C., upon which relatively pure gallium arsenide is formed.

5. A process for producing essentially pure gallium arsenide which comprises heating the constituents gallium and arsenic in substantially elemental form in a chamber to a temperature of from about 850° C. to about 1300° C. in the presence of the vapor of a member selected from the group consisting of free halogens, hydrogen halides, halides of gallium and halides of arsenic, and maintaining a surface within said chamber at a temperature of from about 500° C. to about 900° C. upon which said gallium arsenide is formed.

6. A process for purifying the compound semiconductor gallium arsenide which comprises heating in a chamber relatively impure gallium arsenide to one temperature of from about 850° C. to about 1300° C. in the presence of the vapor member selected from the group consisting of free halogens, hydrogen halides, halides of gallium and halides of arsenic, and maintaining a surface within said chamber at a temperature below the melting point of gallium arsenide and below said one temperature upon which relatively pure gallium arsenide is formed.

7. A process for producing essentially pure gallium arsenide which comprises placing the constituents gallium and arsenic in substantially elemental form in a chamber, evacuating said chamber, introducing into said chamber the vapor of a member selected from the group consisting of free halogens, halogen halides, halides of gallium and halides of arsenic, heating said constituents to one temperature in the range from about 850° C. to about 1300° C. and maintaining a surface within said chamber at a temperature below said one temperature and below the melting point of gallium arsenide upon which the gallium arsenide is formed.

8. A process for purifying the compound semiconductor gallium arsenide which comprises placing an amount of relatively impure gallium arsenide at a first position in a chamber, evacuating said chamber, introducing into said chamber the vapor of a member selected from the group consisting of free halogens, hydrogen halides, halides of gallium and halides of arsenic, heating said relatively impure gallium arsenide to one temperature from about 850° C. to about 1300° C., and heating a surface within said chamber to a temperature from about 500° C. to about 900° C. and at least less than said one temperature.

9. A process for producing the compound gallium arsenide in crystalline form which comprises heating in a chamber gallium arsenide to a temperature sufficiently elevated to effect volatilization thereof in the presence of halides of arsenic and maintaining a surface within said chamber at a temperature below the melting point of gallium arsenide and sufficiently below the first recited temperature to permit the deposition of gallium arsenide in crystalline form thereon.

10. The process according to claim 4, wherein said member is arsenic trichloride.

11. The process according to claim 5, wherein said member is arsenic trichloride.

References Cited

UNITED STATES PATENTS

| | | | |
|---|---|---|---|
| 2,862,787 | 12/1958 | Segium et al. | 23—204 X |
| 3,094,388 | 6/1963 | Johnson et al. | 23—204 |

FOREIGN PATENTS

| | | |
|---|---|---|
| 916,498 | 1/1963 | Great Britain. |

OTHER REFERENCES

Hannay: "Semiconductors," pp. 132–140 (copyright date is Feb. 27, 1959).

Reynolds et al.: "Physical Review," volume 79, pp. 543–544 (1950).

MILTON WEISSMAN, *Primary Examiner.*